(12) United States Patent
Tousignant et al.

(10) Patent No.: US 6,374,907 B1
(45) Date of Patent: Apr. 23, 2002

(54) HYDROFLUOROETHER AS A HEAT-TRANSFER FLUID

(75) Inventors: Lew A. Tousignant; Phillip E. Tuma, both of St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/661,935

(22) Filed: Sep. 14, 2000

Related U.S. Application Data

(60) Provisional application No. 60/158,697, filed on Oct. 8, 1999.

(51) Int. Cl.$^7$ .................................................. F28F 7/00
(52) U.S. Cl. .............................. 165/80.4; 165/104.33; 252/70
(58) Field of Search ........................... 252/70; 165/10, 165/104.33, 80.3

(56) References Cited

U.S. PATENT DOCUMENTS

| | | | |
|---|---|---|---|
| 5,547,593 A | * | 8/1996 | Sanechika et al. ........... 508/207 |
| 5,650,089 A | * | 7/1997 | Gage et al. ................... 252/67 |
| 5,713,211 A | * | 2/1998 | Sherwood .................... 62/114 |
| 6,003,319 A | * | 12/1999 | Gilley et al. .................. 62/3.7 |

FOREIGN PATENT DOCUMENTS

| | | |
|---|---|---|
| CA | 2115984 | 8/1994 |
| WO | WO 97/14762 | 4/1997 |
| WO | WO 99/37598 | 7/1999 |

OTHER PUBLICATIONS

Climate Change 1995: The Science of Climate Change, Contribution of WGI to the Second Assessment Report of the Intergovernmental Panel on Climate Change, edited by J. T. Houghton et al., University Press, Cambridge (1996), pp. 120–122.
G. Marchionni et al., "Hydrofluoropolyethers," *Journal of Fluorine Chemistry*, vol. 95, pp. 41–50 (1999).
M. Visca et al, "Hydrofluoropolyeters: Another alternative to CFCs", American Chemical Society, Chemtech, Feb. 1997, pp. 33–37.
Technical Brochures: Ausimont Montedison Group, "H–Galden™—The Single Fluid Solution for the Most Demanding Heat Transfer Applications".
M. Visca et al., "Hydrofluoropolyether Heat Exchange Fluids", The Earth Technologies Forum, Oct. 30–Nov. 1, 2000, Washington, D.C.
Article: Bivens et al., "Fluoroethers and Other Nest–Generation Fluids," ASHRAE/NIST Refrigerants Conference, Oct., 1997, pp. 122–134.
Article: Tuma et al., "New 'Green' Heat Transfer Fluids," *Solid State Technology*, Jun., 2000, pp. 175–176, 178, 180 and 182.

* cited by examiner

*Primary Examiner*—Christopher Atkinson
(74) *Attorney, Agent, or Firm*—Lisa M. Fagan

(57) ABSTRACT

The present invention provides an apparatus comprising a device and a means for heat transfer comprising a hydrofluoroether heat-transfer fluid wherein the heat transfer fluid is 3-ethoxy-perfluoro(2-methylhexane). Another embodiment of the present invention is a method therefor.

7 Claims, 6 Drawing Sheets

HYDROFLUOROETHER AS A HEAT-TRANSFER FLUID

CROSS REFERENCE TO RELATED PROVISIONAL APPLICATION

This application claims the benefit of U. S. Provisional Application No. 60/158,697, filed Oct. 8, 1999.

FIELD OF INVENTION

This invention relates to hydrofluoroether heat-transfer fluids. More particularly, this invention relates to 3-ethoxy-perfluoro(2-methylhexane) (n-$C_3F_7$CF(O$C_2H_5$)CF($CF_3$)$_2$) as a heat-transfer fluid.

BACKGROUND

Presently various fluids are used for heat transfer. The suitability of the heat-transfer fluid depends upon the application process. For example, some electronic applications require a heat-transfer fluid which is inert, has a high dielectric strength, has low toxicity, good environmental properties, and good heat transfer properties over a wide temperature range. Other applications require precise temperature control and thus the heat-transfer fluid is required to be a single phase over the entire process temperature range and the heat-transfer fluid properties are required to be predictable, i.e., the composition remains relatively constant so that the viscosity, boiling point, etc. can be predicted so that a precise temperature can be maintained and so that the equipment can be appropriately designed.

In the semiconductor industry, there are numerous devices or processes which require a heat-transfer fluid having select properties. The heat-transfer fluid may be used to remove heat, add heat, or maintain a temperature.

Each of the semiconductor processes described below incorporates a device or a work-piece which has heat removed from it or has heat added to it. The heat transfer associated with either the heat removal or addition can take place over a wide temperature range. Thus, in each case a heat-transfer fluid is preferably used which has other attributes that make it "operator friendly". In order for a heat-transfer fluid to be considered "operator friendly", the heat-transfer fluid preferably exhibits low toxicity and low flammability.

For automated test equipment (ATE), equipment is used to test the performance of semiconductor dice. The dice are the individual "chips" that are cut from a wafer of semiconductor substrate. The dice come from the semiconductor foundry and must be checked to ensure they meet functionality requirements and processor speed requirements. The test is used to sort "known good dice" (KGD) from dice that do not meet the performance requirements. This testing is generally performed at temperatures ranging from about −80° C. to about 100° C.

In some cases the dice are tested one-by-one, and an individual die is held in a chuck. This chuck provides, as part of its design, provision for cooling the die. In other cases, several dice are held in the chuck and are tested either sequentially or in parallel. In this situation, the chuck provides cooling for several dice during the test procedure.

It may also be advantageous to test dice at elevated temperatures to determine their performance characteristics under conditions of elevated temperature. In this case, a coolant which has good heat-transfer properties well above room temperature is advantageous.

In some cases, the dice are tested at very low temperatures. For example, CMOS devices in particular operate more quickly at lower temperatures.

If a piece of ATE equipment employs CMOS devices "on board" as part of its permanent logic hardware, it may be advantageous to maintain the logic hardware at a low temperature.

Therefore, to provide maximum versatility to the ATE, a heat-transfer fluid preferably performs well at both low and high temperatures (i.e., preferably has good heat transfer properties over a wide temperature range), is inert (i.e., is non-flammable, low in toxicity, non-chemically reactive), has high dielectric strength, has a low environmental impact, and has predictable heat-transfer properties over the entire operating temperature range.

Etchers operate over temperatures ranging from about 70° C. to about 150° C. In this process, reactive plasma is used to anisotropically etch the features in a wafer. The wafers to be processed are kept at a constant temperature at each selected temperature. Therefore, the heat-transfer fluid preferably is a single phase over the entire temperature range. Additionally, the heat-transfer fluid preferably has predictable performance over the entire range so that the temperature can be precisely maintained.

Ashers operate over temperatures ranging from about 40° C. to about 150° C. This is a process that removes the photosensitive organic "mask".

Steppers operate over temperatures ranging from about 40° C. to about 80° C. This is the process step in semiconductor manufacturing where the reticules needed for manufacturing are produced. Reticules are used to produce the patterns of light and shadow needed to expose the photosensitive mask. The film used in the steppers is typically maintained within a temperature window of +/−0.2° C. to maintain good performance of the finished reticule.

PECVD (plasma enhanced chemical vapor deposition) chambers operate over temperatures ranging from about 50° C. to about 150° C. In this process, films of silicon oxide, silicon nitride, and silicon carbide are grown on a wafer by the chemical reaction initiated in a reagent gas mixture containing silicon and either: 1) oxygen; 2) nitrogen; or 3) carbon. The chuck on which the wafer rests is kept at a uniform, constant temperature at each selected temperature.

Heat-transfer fluids which are presently used in these semiconductor applications include perfluorocarbons (PFCs), perfluoropolyethers (PFPEs), water/glycol mixtures, deionized water, silicone oils and hydrocarbon oils. However, each of these heat-transfer fluids has some disadvantage. PFCs and PFPEs are environmentally persistent, that is they exhibit atmospheric lifetime values of greater that 500 years, and up to 5,000 years. Water/glycol mixtures are temperature limited, that is, a typical low temperature limit of such mixtures is −40° C. At low temperatures water/glycol mixtures also exhibit relatively high viscosity. The high viscosity at low temperature yields high pumping power. Deionized water has a low temperature limit of 0° C. Deionized fluids (water or water glycol) are limited to a high temperature of 80° C. because this is the operating limit of commercially available deionizing beds. However, this high temperature limit may be significantly lower if high electrical resistivity is desired because deionized fluids become quite corrosive. Silicone oils and hydrocarbon oils are typically flammable.

Removing heat from electronic devices has become one of the most important obstacles to further improving processor performance. As these devices become more powerful, the amount of heat generated per unit time increases. Therefore, the means of heat transfer plays an important role in processor performance. The heat-transfer fluid preferably has good heat transfer performance, good electrical compatibility (even if used in "indirect contact" applications such as those employing cold plates), as well as low toxicity, low (or non-) flammability and low environmental impact. Good electrical compatibility requires the heat-transfer fluid candidate to exhibit high dielectric strength, high volume resistivity, and poor solvency for polar materials. Additionally, the heat-transfer fluid candidate must exhibit good mechanical compatibility, that is, it must not affect typical materials of construction in an adverse manner. In this application, heat-transfer fluid candidates are disqualified if their physical properties are not stable over time.

Materials currently used as heat-transfer fluids for cooling electronics or electrical equipment include PFCs, PFPEs, silicone oils, and hydrocarbon oils. Each of these heat-transfer fluids has some disadvantage. PFCs and PFPEs are environmentally persistent. Silicone oils and hydrocarbon oils are typically flammable.

Thermal shock testing is generally performed at temperatures ranging from about −150° C. to about 170° C. The rapid cycling of temperature in a part or device may be required to simulate the thermal changes brought on by, for instance, launching a missile. Thermal shock testing is required for electronics used for military missiles, among other things. There are several military specifications related to thermal shock testing of many electronic components and assemblies. This test uses various means of imparting rapidly changing temperatures within a part or electronic device. One such device employs a liquid heat-transfer fluid or liquid heat-transfer fluids that are kept in separate reservoirs maintained at temperature extremes where parts are alternately immersed to induce thermal shock to the test part. Typically, operators load and unload the components or assemblies to and from the thermal shock equipment. Therefore, it is important that a heat-transfer fluid used in such an application exhibit low toxicity, low flammability, and low environmental impact. Heat-transfer fluids which are liquid over a wide temperature range coupled with low toxicity, low flammability, and low environmental impact are ideal for thermal shock testing.

Materials currently used as heat-transfer fluids for liquid/liquid thermal shock test baths include liquid nitrogen, PFCs, and PFPEs. Each of these heat-transfer fluids has some disadvantage. Liquid nitrogen systems offer limited temperature selectivity at the low temperature end. PFCs and PFPEs are environmentally persistent.

Constant temperature baths are typically operated over a broad temperature range. Therefore, desirable heat-transfer fluids preferably have a wide liquid range and good low-temperature heat transfer characteristics. A heat-transfer fluid having such properties allows a very wide operating range for the constant temperature bath. Typically, most testing fluids require fluid change-out for wide temperature extremes. Also, good temperature control is essential for accurately predicting physical properties of the heat-transfer fluids.

Heat-transfer fluids which are presently used in this application include: perfluorocarbons (PFCs), perfluoropolyethers (PFPEs), water/glycol mixtures, deionized water, silicone oils, hydrocarbon oils, and hydrocarbon alcohols. Each of these heat-transfer fluids has some disadvantage. PFCs and PFPEs are environmentally persistent. Water/glycol mixtures are temperature limited, that is, a typical low temperature limit of such mixtures is −40° C. At low temperatures water/glycol mixtures also exhibit relatively high viscosity. Deionized water has a low temperature limit of 0° C. Silicone oils, hydrocarbon oils and hydrocarbon alcohols are typically flammable.

For heat-transfer processing requiring an inert fluid, fluorinated materials are often used. Fluorinated materials typically have low toxicity, are essentially non-irritating to the skin, are non-chemically reactive, are non-flammable, and have high dielectric strength. Fluorinated materials such as perfluorocarbons, perfluoropolyethers, and hydrofluoroethers provide the additional advantage of not depleting the ozone layer in the stratosphere.

As discussed above, perfluorocarbons, perfluoropolyethers, and some hydrofluoroethers have been used for heat-transfer.

Perfluorocarbons (PFCs) exhibit several traits advantageous to the applications discussed above. PFCs have high dielectric strength and high volume resistivity. PFCs are non-flammable and are generally mechanically compatible with materials of construction, exhibiting limited solvency. Additionally, PFCs generally exhibit low toxicity and good operator friendliness. PFCs are manufactured in such a way as to yield a product that has a narrow molecular weight distribution. They do exhibit one important disadvantage, however, and that is long environmental persistence.

Perfluoropolyethers (PFPEs) exhibit many of the same advantageous attributes described for PFCs. They also have the same major disadvantage, i.e., long environmental persistence. In addition, the methods developed for manufacturing these materials yield products that are not of consistent molecular weight and thus are subject to performance variability.

Hydrofluoropolyethers (HFPEs) (a class of hydrofluoroethers (HFEs)) exhibit some of the same advantageous attributes of PFCs, but differ greatly in two areas. To their credit, they exhibit markedly lower environmental persistence, yielding atmospheric lifetimes on the order of decades rather than millennia. However, some of the HFPEs taught as heat-transfer fluids are a mixture of components of widely disparate molecular weight. Thus, their physical properties may change over time which makes it difficult to predict performance.

Some hydrofluoroethers have been disclosed as heat-transfer fluids. However, these HFEs have relatively narrow liquid ranges and tend not to have boiling points over 100° C.

Therefore, the need exists for a heat-transfer fluid which is inert, has good environmental and worker safety properties, has compatible electrical properties, is a liquid over a wide temperature range, is a single empirical formula, and has good heat-transfer properties over a wide range of temperatures.

SUMMARY OF INVENTION

The present invention provides a hydrofluoroether heat-transfer fluid which is inert, has good environmental and worker safety properties, has compatible electrical properties, is liquid over a wide temperature range, is essentially a single isomer or has a single empirical formula, and has good heat-transfer properties over a wide range of temperature. The present invention comprises an apparatus requiring heat-transfer comprising a device, and a means for transferring heat to or from said device, comprising using a heat-transfer fluid, wherein the heat-transfer fluid is 3-ethoxy-perfluoro(2-methylhexane).

Another embodiment of the present invention is a hydrofluoroether heat-transfer fluid having a single empirical formula and having a liquid range from about −95° C. to about 128° C.

Another embodiment of the present invention is a method for transferring heat comprising the steps of: providing a device, providing a means for transferring heat comprising a heat-transfer fluid, and using the heat-transfer fluid to transfer heat to or from the device, wherein the heat-transfer fluid is 3-ethoxy-perfluoro(2-methylhexane).

There figures are not to scale and are intended to be merely illustrative and non-limiting.

DETAILED DESCRIPTION OF ILLUSTRATIVE EMBODIMENTS

The present invention provides an apparatus and a method for heat-transfer using 3-ethoxy-perfluoro(2-methylhexane) as a heat-transfer fluid. The apparatus of the present invention comprises a device and a means for transferring heat comprising a heat-transfer fluid.

Examples of apparatuses of the present invention include, but are not limited to, test heads used in automated test equipment for testing the performance of semiconductor dice; wafer chucks used to hold silicon wafers in ashers, steppers, etchers, PECVD tools; constant temperature baths, and thermal shock test baths.

Heat-transfer Fluid

Figure 1:
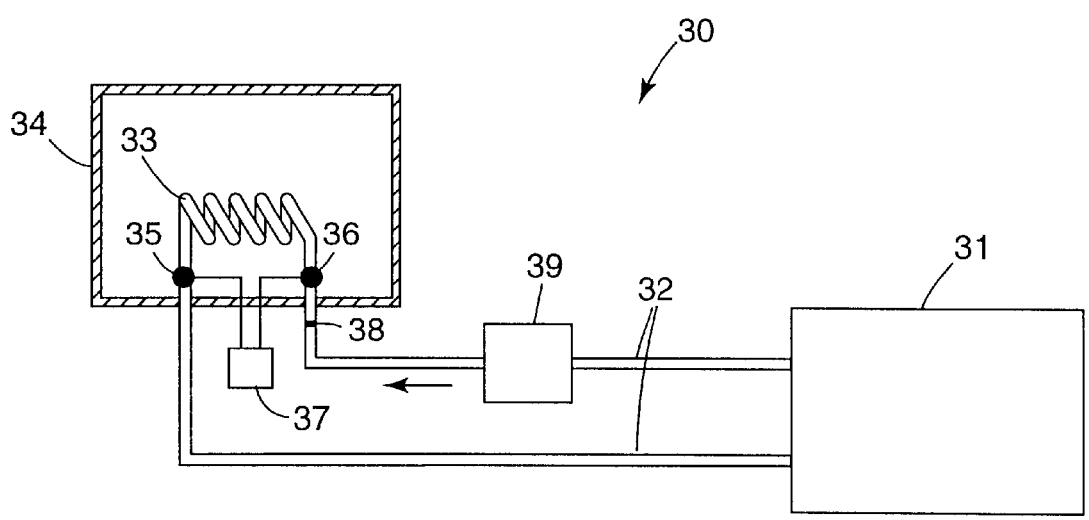
FIG. 1 is a schematic of an apparatus 30 of the present invention comprising an adiabatic enclosure 34 comprising coils 33, and chiller 31.
Figure 2:
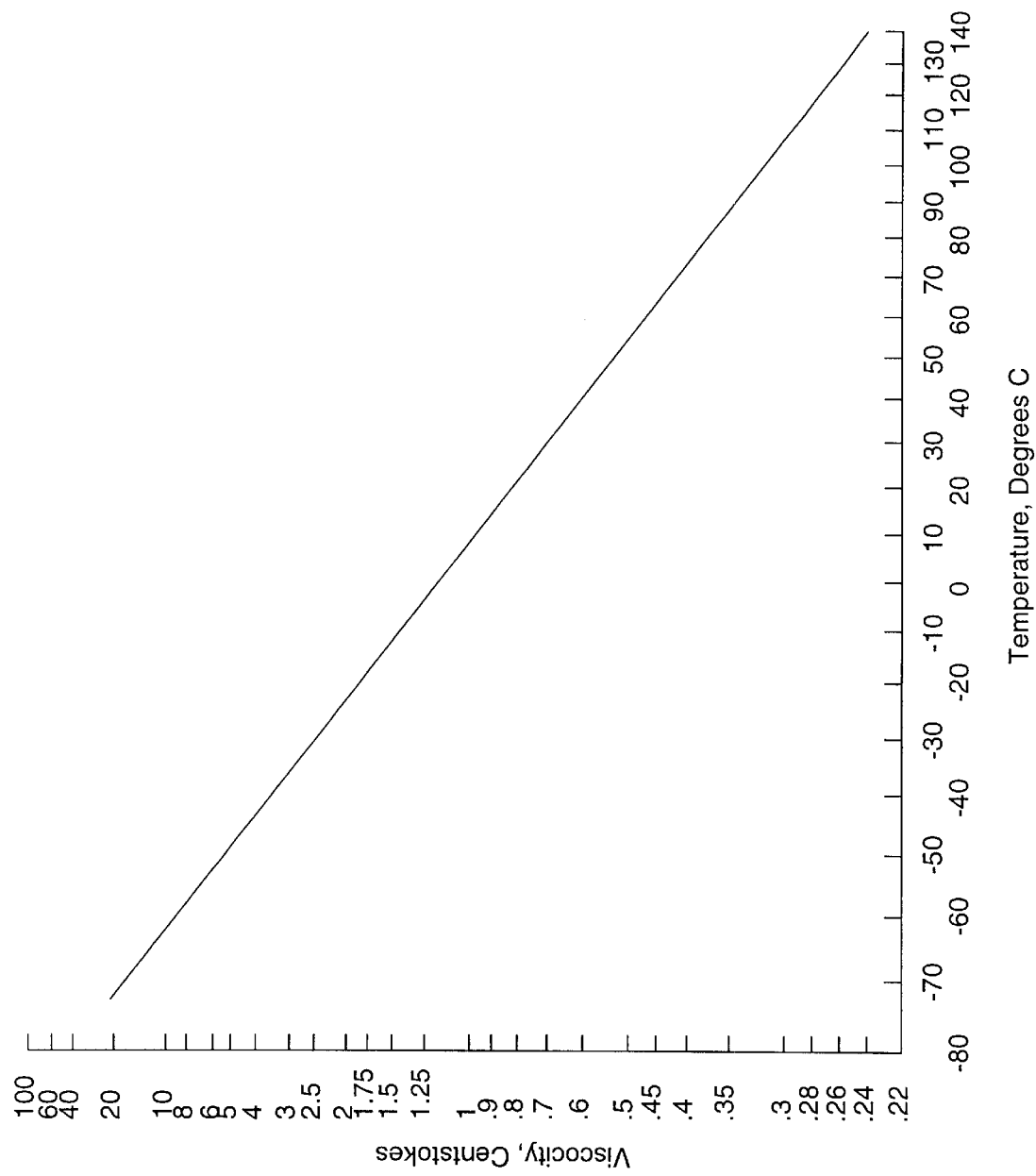
FIG. 2 is a graph illustrating the temperature versus viscosity for 3-ethoxy-perfluoro(2-methylhexane).
Figure 3:
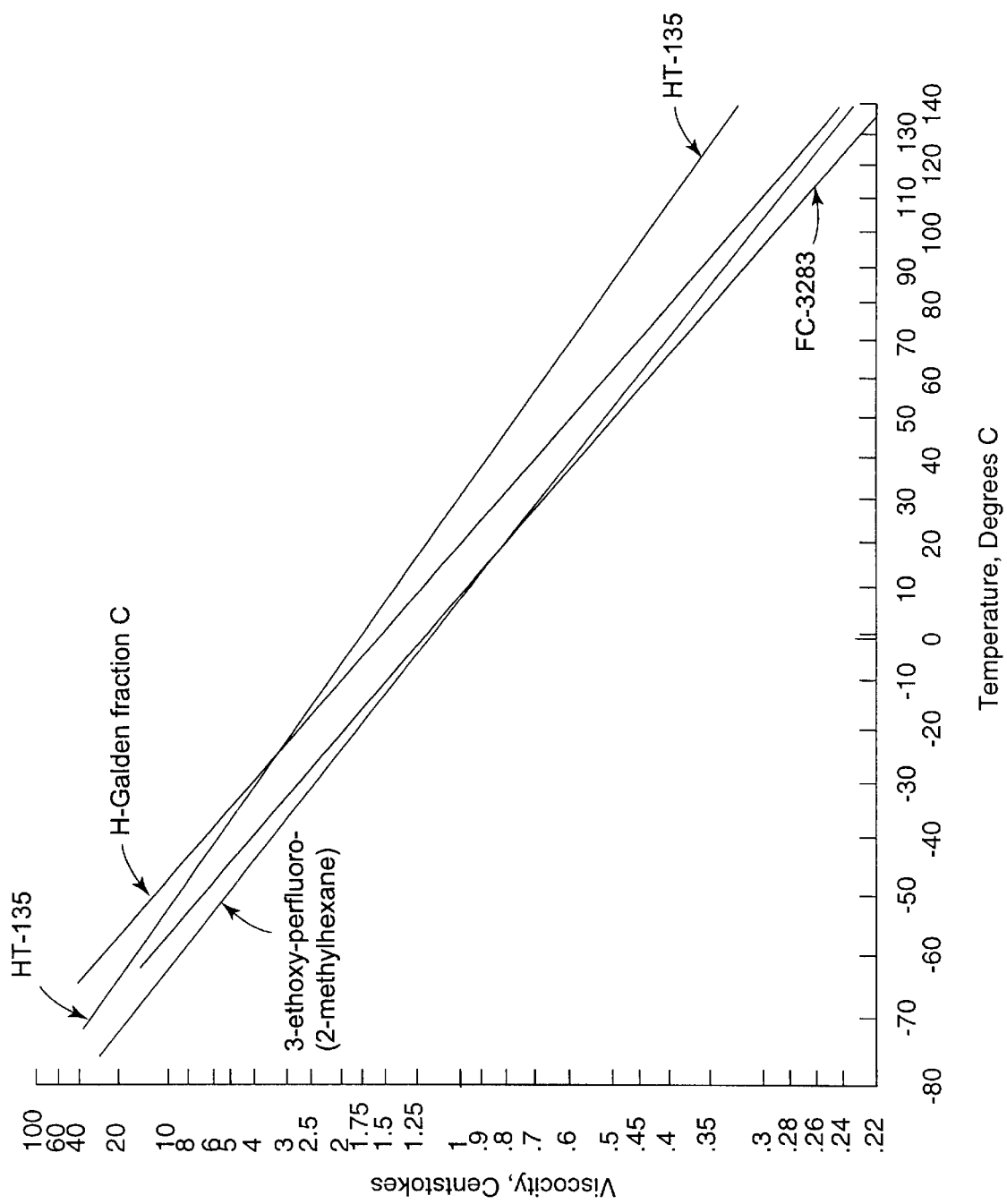
FIG. 3 is a graph illustrating the temperature versus viscosity for various heat-transfer fluids.

As discussed above, the present invention utilizes a specific hydrofluoroether heat-transfer fluid. The heat-transfer fluid is used to heat, cool, and/or maintain the temperature of the device at a select temperature. The heat-transfer fluid is inert, non-flammable, non-aqueous, and environmentally acceptable. Additionally, the heat-transfer fluid of the present invention has good heat transfer properties over a wide temperature range. FIG. 2 shows how the viscosity varies with temperature.

Advantageously, the heat-transfer fluid of the present invention is a single composition having a purity of at least 95 percent, preferably at least 99 percent 3-ethoxy-perfluoro(2-methylhexane), as determined by proton and fluorine NMR analysis. This molecule can be manufactured as a very high purity product, using the following process: Perfluoro (n-propyl)carbonyl fluoride (n-$C_3F_7COF$, 85 percent minimum purity) is reacted with hexafluoropropylene and anhydrous potassium fluoride (spray dried, stored at 125° C., ground to a granular powder shortly before use) in an anhydrous aprotic solvent, such as diethylene glycol dimethylether (diglyme) in a pressurized reaction vessel, such as a Parr reactor, at a temperature of about 70° C. for about 3 hours. Then a slight molar excess of diethyl sulfate and a quaternary ammonium salt, such as a triallyl monomethyl ammonium halide, are added, and the resulting mixture is heated to about 50° C. for about 3 days with maximum agitation. The reactor is then charged with aqueous alkali, e.g., potassium hydroxide, and heated to about 85° C. for about 1½ hours. The contents of the reactor are then distilled to give a crude product containing about 85–90 percent 3-ethoxy-perfluoro(2-methylhexane).

The crude product is fractionated, for example, using a 10-plate vacuum jacketed Oldershaw column, water-washed, and dried over a desiccant such as anhydrous magnesium sulfate.

NMR analysis of the purified product typically shows a purity after fractionation of greater than 99.7 percent 3-ethoxy-perfluoro(2-methylhexane).

The heat-transfer fluid of the present invention has the following structure:

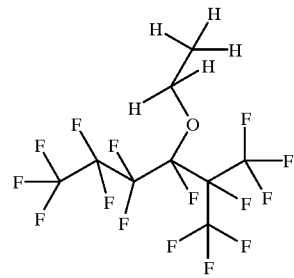

This molecule can be manufactured as a very high purity product, with over 95 percent isomeric purity. Thus, this heat-transfer fluid is particularly suitable for those processes or apparatuses requiring precise temperature control.

Device

The present invention comprises a device. The device is defined herein as a component, work-piece, assembly, etc. to be cooled, heated or maintained at a selected temperature. Examples of devices of the present invention include, but are not limited to microprocessors, wafers used to manufacture semiconductor devices, power control semiconductors, electrical distribution switch gear, power transformers, circuit boards, multi-chip modules, packaged and unpackaged semiconductor devices, chemical reactors, nuclear reactors, fuel cells, lasers, and missile components.

Means for Transferring Heat

The present invention comprises a means for transferring heat. Heat is transferred by placing the heat transfer means in thermal contact with the device. The heat transfer means, when placed in thermal contact with the device, removes heat from the device or provides heat to the device, or maintains the device at a selected temperature. The direction of heat flow (from device or to device) is determined by the relative temperature difference between the device and the heat transfer means.

The heat transfer means comprises the heat-transfer fluid of the present invention.

Additionally, the heat transfer means may include facilities for managing the heat-transfer fluid, including, but not limited to: pumps, valves, fluid containment systems, pressure control systems, condensers, heat exchangers, heat sources, heat sinks, refrigeration systems, active temperature control systems, and passive temperature control systems.

Examples of suitable heat transfer means include, but are not limited to, temperature controlled wafer chucks in PECVD tools, temperature controlled test heads for die performance testing, temperature controlled work zones within semiconductor process equipment, thermal shock test bath liquid reservoirs, and constant temperature baths.

In some systems, such as etchers, ashers, PECVD chambers, thermal shock testers, the upper desired operating temperature may be as high as 150° C., which is higher than the boiling point of 3-ethoxy-perfluoro(2-methylhexane) at ambient pressure (128° C.). In such systems, the boiling point of the 3-ethoxy-perfluoro(2-methylhexane) can be easily elevated to at least 150° C. by employing a slightly elevated system pressure, typically about 2 psig (860 torr absolute).

Method

The present invention comprises a method for transferring heat comprising the steps of: providing a device, providing a means for transferring heat comprising a heat-transfer fluid, and using the heat-transfer fluid to transfer heat to or from the device, wherein the heat-transfer fluid is 3-ethoxy-perfluoro(2-methylhexane).

EXAMPLES

The present invention will be further described with reference to the following nonlimiting examples and test methods. All parts, percentages, and ratios are by weight unless otherwise specified.

Example 1

Preparation of n-$C_3F_7CF(OC_2H_5)CF(CF_3)_2$

Into a dry 600 milliliter Parr reactor were added 36.3 grams (0.625 mole) of anhydrous potassium fluoride and 108 grams of anhydrous diglyme (diethylene glycol dimethyl ether). The potassium fluoride was made by spray drying, was stored at 125° C., and was ground shortly before use. The contents in the reactor were cooled with dry ice, then 125 grams (0.52 mole) of n-$C_3F_7COF$ (approximately 90 percent purity) were added. When the reactor reached a temperature of 52° C. and pressure of 65 psig (4190 torr), 101.5 grams (0.68 mole) of $CF_3CF=CF_2$ (hexafluoropropylene) were added at 70° C. and at a pressure range of 18–75 psig (1690–4640 torr) over approximately a three hour period, followed by a two hour hold period at 70° C. The reactor and its contents were allowed to cool to room temperature, the reactor was opened, and to the reactor were added an additional 1.5 grams of potassium fluoride, along with 14.5 grams (0.016 mole) of ADOGEN™ 464 and 119.2 grams (0.77 mole) of diethyl sulfate. ADOGEN™ 464, available from Witco. Corp., Oleo/Surfactant Group, Greenwich, Conn., is a tri(octyldecyl) monomethyl quaternary ammonium chloride, 90 percent active; for this experiment, the ADOGEN™ 464 was diluted with anhydrous glyme and was vacuum fractionated of alcohol solvent to a 50 weight percent concentration. The Parr reactor was again sealed and was heated to 52° C. with maximum agitation for three days. The reactor was then pressure-charged with 60 grams of 45 weight percent aqueous potassium hydroxide and 50 grams of deionized water, was again sealed, and was heated to 85° C. for 1½ hours. The reaction was allowed to cool overnight, the reactor was vented, and its contents were transferred to a flask for distillation. 235.2 grams of product were recovered, representing a 96.9 percent yield based on the $C_3F_7COF$ charge. Percent purity was 88.7 percent, based on analysis by gas chromatograph.

The recovered crude product was fractionated on a 10-plate vacuum jacketed Oldershaw column, water-washed, and dried over anhydrous magnesium sulfate. A portion of the distilled and washed product was accurately weighed when placed into an NMR tube and was spiked with a known amount of 1,4-bis(trifluoromethyl)benzene (p-HFX) for use as a cross integration or internal standard.

Then a 400 MHz $^1$H-NMR spectrum (#h56881.401) and a 376 MHz $^{19}$F-NMR spectra spectrum (#f56881.402) were measured at room temperature using a Varian UNITYplus 400 FT-NMR spectrometer. This method of preparation permitted the p-HFX to be used as either 1) an internal standard for measuring the absolute weight percent concentrations of specific components; or 2) as a cross integration standard to facilitate the cross correlation of the various fluorine and proton signal intensities for evaluation of the overall sample composition.

The results from the proton and fluorine NMR cross integration determination are shown below in Table 1.

TABLE 1

| Component Structures | $^1$H/$^{19}$F-NMR Relative Wt. % Concentrations (single trial measurement) |
|---|---|
| n-$CF_3CF_2CF_2CF(OCH_2CH_3)$—$CF(CF_3)_2$ | 99.86% |
| [$(CF_3)_2$—$CF$]$_2$—$CF$—$O$—$CH_2CH_3$ | 0.093% |
| $CF_3CF_2CF_2CF(OCH_3)$—$CF(CF_3)_2$ | 0.044% |
| $CF_3OCF_2CF_2CF(OCH_2CH_3)CF(CF_3)_2$ | 0.0057% |
| Possible Acetone | 0.0005% |

Results from the NMR analysis indicated the washed distillate to contain 99.96 percent of n-$C_3F_7CF(OC_2H_5)CF(CF_3)_2$, the desired product.

Analysis of several other n-$C_3F_7CF(OC_2H_5)CF(CF_3)_2$ preparations made using essentially the same synthetic and purification procedures showed percent purities of 99.71, 99.89, and 99.96 percent.

The liquid density of n-$C_3F_7CF(OC_2H_5)CF(CF_3)_2$ was measured from 10° C. to 90° C. using an Anton-Parr Model DMA58 densitometer with a DMA602 external cell. Densities below this temperature were obtained by linear extrapolation of the available data.

The specific heat of n-$C_3F_7CF(OC_2H_5)CF(CF_3)_2$ was measured by differential scanning calorimetry according to ASTME 1269-90 over a temperature range of −50° C. to 50° C.

The kinematic viscosity of n-$C_3F_7CF(OC_2H_5)CF(CF_3)_2$ was measured using a Cannon-Fenske viscometer over the temperature range −80° C. to 23° C. Data were regressed using methods outlined in ASTM Standard D 341-77.

The thermal conductivity of n-$C_3F_7CF(OC_2H_5)CF(CF_3)_2$ was not measured. Instead, experimentally-determined values for the hydrofluoroether $C_4F_9OC_2H_5$ were used. These values were determined using a transient, hot-wire thermal conductivity cell over the temperature range of −50° C. to +50° C., according to ASTM D 2717-86. A platinum wire was used in the measurements. The wire was 20 centimeter length, 0.17 millimeter diameter, and had a resistance of 120Ω at 20° C. The thermal conductivity at 25° C. was 0.066 W/m° C.

TABLE 2

| Liquid Density at 25° C. | 1614 kg/m$^3$ |
|---|---|
| Specific Heat at 25° C. | 1128 J/kg° C. |
| Kinematic Viscosity at 25° C. | 0.77 centistokes |

Comparative Example C1

A comparative perfluorinated material evaluated was FLUORINERT™ FC-3283 Electronic Fluid (available from Minnesota Mining and Manufacturing Co., St. Paul, Minn.). FC-3283 is perfluoro(tripropylamine) and contains mixed isomers. The boiling point at atmospheric pressure is about 130° C.

Comparative Example C2

A comparative perfluoropolyether evaluated was GALDEN™ HT-135, a commercially available material, made by Ausimont, a division of Montefluos, Milan, Italy. GALDEN™ HT-135's general structure is:

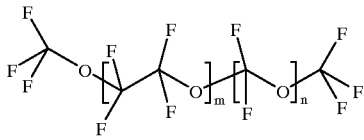

In this product, the following five pairings of m and n make up the bulk of the structures:

TABLE 3

|  | Structure 1 | Structure 2 | Structure 3 | Structure 4 | Structure 5 |
|---|---|---|---|---|---|
| MW, Daltons | 584 | 600 | 616 | 618 | 634 |
| Proportion | Various | Various | Various | Various | Various |
| m | 2 | 1 | 0 | 4 | 3 |
| n | 3 | 5 | 7 | 0 | 2 |

Coomparative Example C3

A comparative hydrofluoropolyether evaluated was H-GALDEN™ ZT-130 (fraction C), a developmental material disclosed in Journal of Fluorine Chemistry. The molecular weight distribution is listed in "Journal of Fluorine Chemistry" 95, 1999, 41–50, article titled "Hydrofluoropolyethers" by Marchionni et al. as: 17.9% M=416 Daltons, 38.8% M=466 Daltons, 18.1% M=532 Daltons, and 21.9% M=582 Daltons. The following is disclosed as H-GALDEN™ ZT-130:

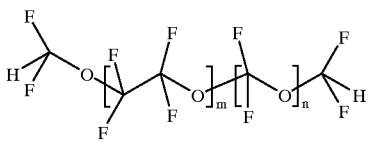

In addition, the following proportions are disclosed as extant in H-GALDEN™ ZT-130 in the same article:

TABLE 4

|  | Structure 1 | Structure 2 | Structure 3 | Structure 4 |
|---|---|---|---|---|
| MW, Daltons | 416 | 466 | 532 | 582 |
| Proportion | 17.9% | 38.8% | 18.1% | 21.9% |
| m | 2 | 3 | 3 | 4 |
| n | 1 | 0 | 1 | 0 |

Table 5 shows a comparison based on theoretical analysis of the various fluids at conditions of turbulence (Re>2300), yielding a heat transfer coefficient of 583 W/(M²° C.) through a 0.477 cm ID tube at −20° C.

For the theoretical analyses, fully developed, steady pipe flow calculations were used to compare the three fluids flowing through a 0.477 cm inner diameter smooth pipe. This diameter is equivalent to that used in the experimental portion of this work. A useful independent variable for comparing the fluids is the thermal capacity, C, defined as $$C = \dot{m}c \quad (1)$$

Here $\dot{m}$ is the mass flow rate and c is the specific heat of the fluid. The fluid properties were evaluated at a constant temperature. This uniform temperature assumption is equivalent to a "no load" or adiabatic condition.

The heat transfer coefficient, h, was calculated from the definition of the Nusselt number, Nu, $$Nu \equiv \frac{hd}{k} \quad (2)$$

where d is the pipe diameter and k is the thermal conductivity of the fluid. The Nusselt number in the laminar regime (Re<2300) is constant at 4.36. In the transition and turbulent regimes (Re>2300), a correlation by Gnielinski (1) was used $$Nu = \frac{f/8(Re - 1000)Pr}{1 + 12.7(f/8)^{1/2}(Pr^{2/3} - 1)} \quad (3)$$

This correlation is valid for 2300<Re<5×10⁶ and 0.5<Pr<2000 and these conditions were met for the fluids shown. The Reynolds number, Re, is defined as $$Re \equiv \frac{\rho V d}{\mu} = \frac{V d}{\nu} \quad (4)$$

and the Prandtl number, Pr, as $$Pr \equiv \frac{\mu c}{k} = \frac{\nu \rho c}{k} \quad (5)$$

where $\mu$ is the absolute viscosity (centipoise), $\nu$ is the kinematic viscosity (centistokes) and ρ is the fluid density. The gradient of pressure along the pipe length, dp/dx, was calculated using relations for the smooth pipe friction factor, f $$f = 0.184 Re^{-1/5} \quad Re > 2 \times 10^4 \quad (6)$$

$$f = 0.316 Re^{-1/4} \quad 2300 \leq Re \leq 2 \times 10^4 \quad (7)$$

$$f = \frac{64}{Re} \quad Re < 2300 \quad (8)$$

and the definition of the friction factor $$\frac{dp}{dx} = f \frac{\rho V^2}{2d} \quad (9)$$

where V is the average fluid velocity $$V = \frac{\dot{m}}{\rho} \frac{4}{\pi d^2} \quad (10)$$

The pumping power, P, per unit length, L, of pipe can then be calculated using $$P/L = \frac{dp}{dx} \frac{\dot{m}}{\rho} \quad (11)$$

The pumping power calculation was made for various fluorinated fluids and is presented in TABLE 5, along with various physical properties of the fluids.

TABLE 5

| | Pumping power, w/m | Initial Boiling point, °C | Gel temp, °C | Major constituent MW range, Daltons | Molecular weight window, Daltons | $\frac{\Delta MW}{MW}$ |
|---|---|---|---|---|---|---|
| n-C$_3$F$_7$CF(OC$_2$H$_5$)CF(CF$_3$)$_2$ | 0.197 | 128 | −100 | 414 | 0 | 0% |
| H-GALDEN ™, ZT-130 (comparative) | 0.313 | 125 | −115 | 416–582 | 166 | 35% |
| HT-135 (comparative) | 0.704 | 135 | <−100 | 584–634 | 50 | 8% |
| FC-3283 (comparative) | 0.292 | 130 | −50 | 521 | 0 | 0% |

In the case of pumping power, lower is better. Lower pumping power means a given system generates smaller external heat loads and thus is more efficient. Further, the cost is less to cool or heat the device if the pumping power is lower.

As can be seen, n-C$_3$F$_7$CF(OC$_2$H$_5$)CF(CF$_3$)$_2$ has the lowest theoretical pumping power.

Even though n-C$_3$F$_7$CF(OC$_2$H$_5$)CF(CF$_3$)$_2$ is very nearly a pure compound, it exhibits a liquid range that is very close to that of H-GALDEN™, ZT-130, which is a mixture of four major constituents ranging in molecular weight from 416 to 582 Daltons. As materials that are blends typically show depressed freezing points and elevated boiling points, it is expected that a pure example of any one of the four major constituents would have a liquid range narrower than the four-component mixture documented in Marchionni. Indeed, the fact that a pure material such as n-C$_3$F$_7$CF(OC$_2$H$_5$)CF(CF$_3$)$_2$ exhibits a liquid range so close to that of the four part mixture is surprising. Similar comparisons can be made to GALDEN™ HT-135, itself a five-component blend with a molecular weight window of 50 Daltons.

Note that of all the heat-transfer fluids compared above, n-C$_3$F$_7$CF(OC$_2$H$_5$)CF(CF$_3$)$_2$ also exhibits the additional advantageous properties. n-C$_3$F$_7$CF(OC$_2$H$_5$)CF(CF$_3$)$_2$ exhibits low toxicity, no flammability, and low environmental impact. Additionally, this hydrofluoroether exhibits near-isomeric purity, and thus does not have a drift in its properties with time due to changing composition.

FC-3283 has a pour point of −50° C. and therefore has smaller liquid range than does GALDEN™ HT-135. Further, it is environmentally persistent.

GALDEN™ HT-135 is a material that is environmentally persistent, and it is a blend of materials with a molecular weight window of 50 Daltons.

H GALDEN™ ZT-130 is a blend of materials whose molecular weight window is 166 Daltons. The physical properties may "drift" with time due to changing composition which may impact boiling point, pour point, and viscosity.

H GALDEN™ ZT-130 also has a higher global warming potential and atmospheric lifetime. According to G. Marchionni et al., "Hydrofluoropolyethers," *Journal of Fluorine Chemistry*, 95, pp. 41–50 (1999), the H-GALDEN™ fluids all are predicted to have global warming potentials of about 1800–2000 and atmospheric lifetimes of about 12–14 years. In contrast, the n-C$_3$F$_7$CF(OC$_2$H$_5$)CF(CF$_3$)$_2$ has a predicted global warming potential of only about 190 and an atmospheric lifetime of only about 2.5 years. For procedure used to calculate global warming potentials and atmospheric lifetimes, see *Climate Change 1995: The Science of Climate Change, Contribution of WGI to the Second Assessment Report of the Intergovernmental Panel on Climate Change*, edited by J. T. Houghton et al., University Press, Cambridge (1996).

Example 2

Figure 4:
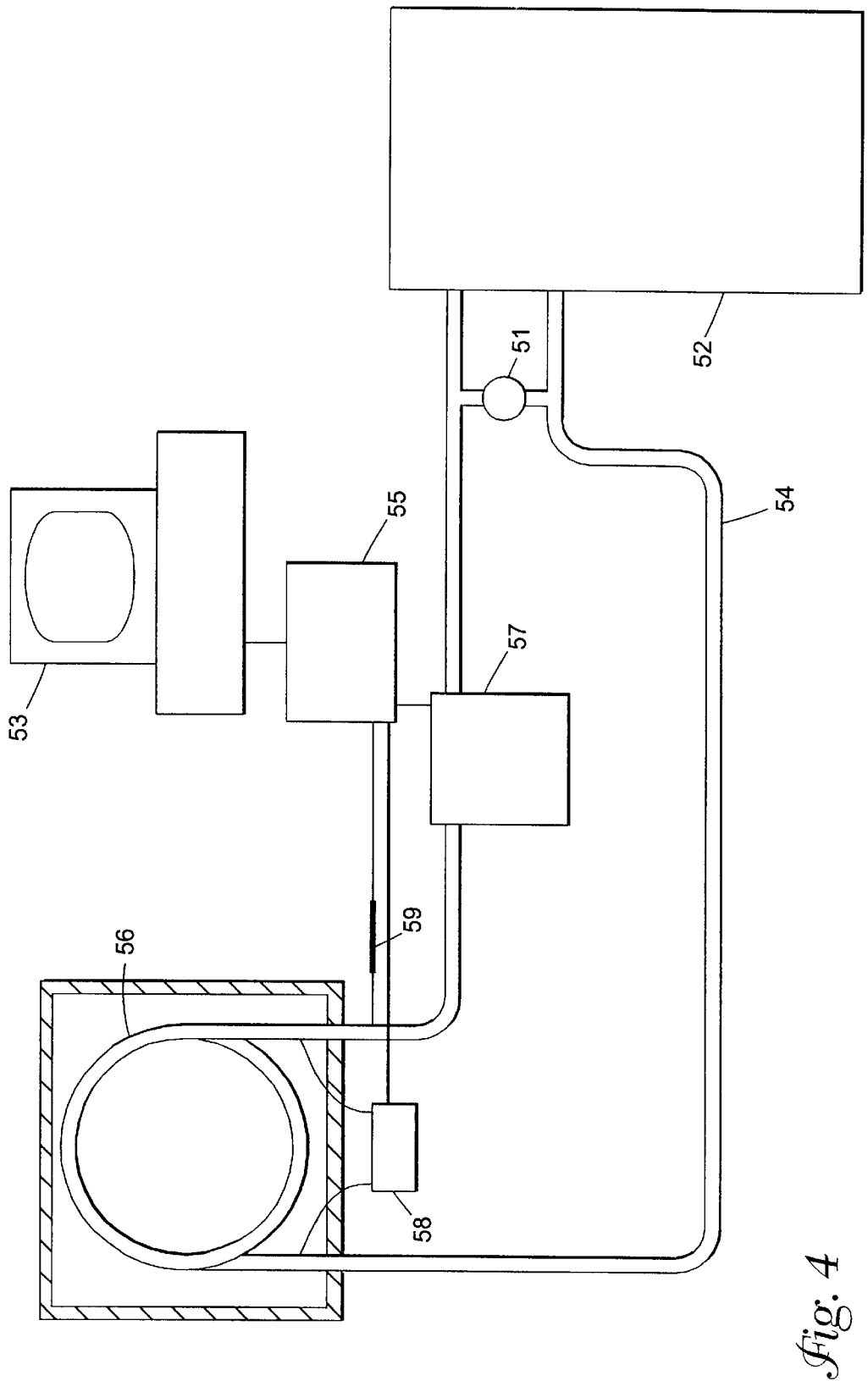
FIG. 4 is a schematic of the equipment used in Example 3.

Experiments were run to verify the pressure drop predictions of the theoretical model detailed above at −40° C. The experimental apparatus is shown schematically in FIG. 4. The apparatus consists of an FTS Model RC-210B-20W chiller 52 connected with insulated polyethylene tubing 54 to a 1.35 meter length of 0.477 cm inner diameter copper tubing which is rolled into a thirty cm diameter coil 56. Holes (0.014 inch (0.0356 cm diameter)) drilled 1.04±0.01 meters apart on the coil serve as static pressure taps. This leaves thirty-one pipe diameters upstream of the inlet static pressure taps and downstream of the outlet static pressure taps. These taps are connected to the ports of an Omega model XPC100DTH differential pressure transducer 58 (0–100 psid, ±0.5% of full scale). The mass flow through the coil is modulated with a manually-operated bypass valve 51. A ¹⁄₁₆" (0.16 cm) diameter type-J thermocouple 59 is installed in the inlet line just upstream of the coil such that more than thirty probe diameters were wetted by the flow. A micro motion model S025S119 (0–10 kg/min, ±0.1% of full scale) mass flow meter 57 is installed in the inlet line to the coil. Signals from the thermocouple, pressure transducer, and mass flow meter are fed through a National Instruments SCXI data acquisition system 55 to a desktop personal computer running LABVIEW™ data acquisition software 53.

Once the mass flow is set and the chiller temperature is stable, the data acquisition program records and averages 500 measurements. The standard deviations for measurements of pressure, mass flow and temperature are typically 1600 Pa, 0.0001 kg/s and 0.06° C., respectively and are roughly independent of mass flow.

Figure 5:
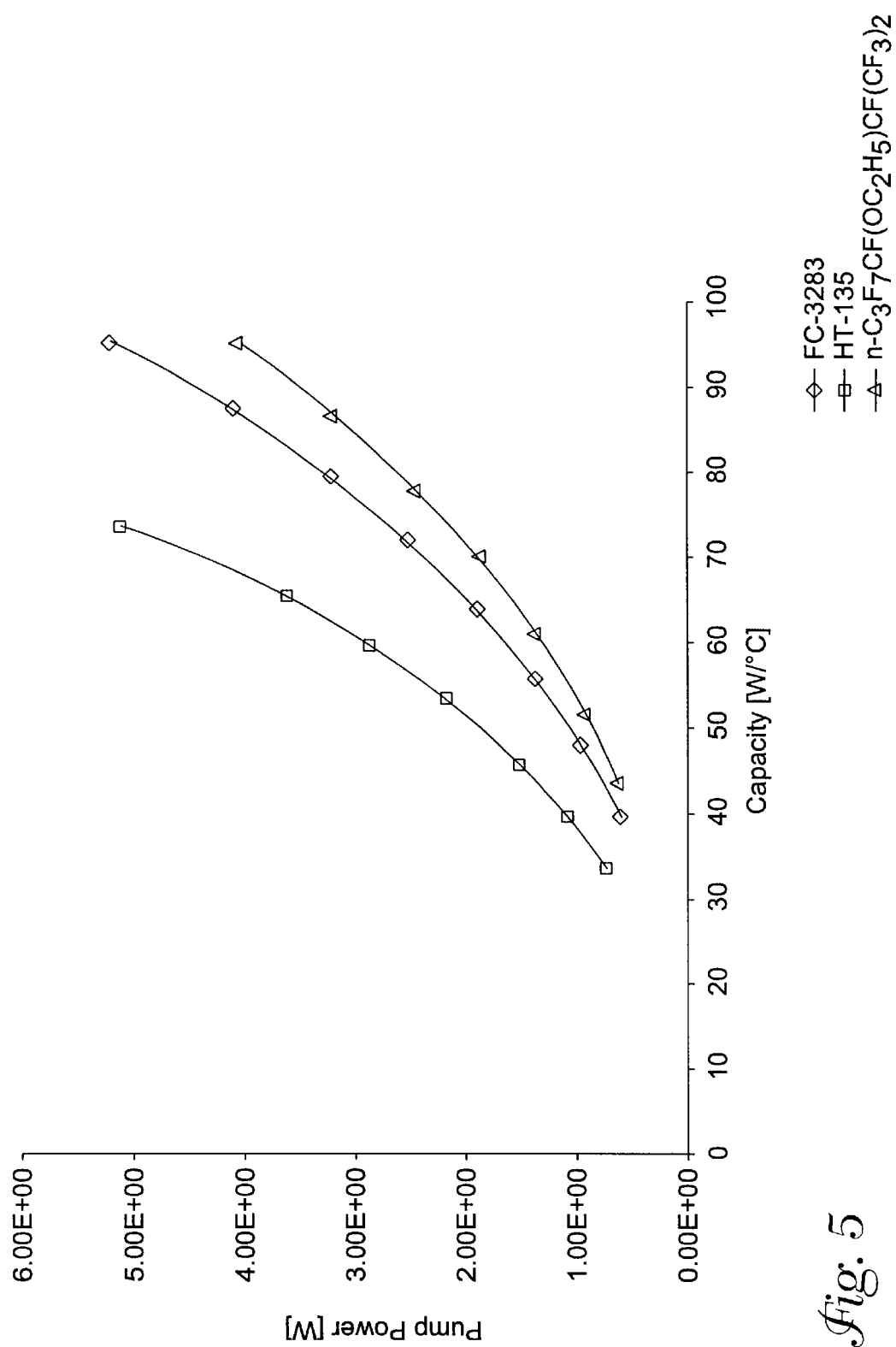
FIG. 5 is a graph of the data from Example 3 of pump power versus heat capacity.

The data obtained from these experiments are processed using Equations 1 and 11 to calculate heat transfer capacity and pumping power, respectively. These calculations require knowledge of the pipe length, specific heat and liquid density only. See FIG. 5.

Example 3

Freezing or pour points were measured for 3 related hydrofluoroether samples:
(1) n-C$_2$F$_5$CF(OC$_2$H$_5$)CF(CF$_3$)$_2$
(2) n-C$_3$F$_7$CF(OC$_2$H$_5$)CF(CF$_3$)$_2$
(3) n-C$_4$F$_9$CF(OC$_2$H$_5$)CF(CF$_3$)$_2$ The freeze and or pour points were measured by cooling a 1 ml sample contained in a double walled glass tube. The outer tube was sealed at both ends and had side ports for the addition of nitrogen gas. The inner tube was sealed at one end. The annular space between the tubes was purged with dry nitrogen and sealed. The sample was introduced into the inner tube and sealed with a septum. The temperature of the sample contained in the inner tube was monitored with an Omega Model DP-41 (available from Omega Engineering, Inc., Stamford, Conn.) resistance thermal device inserted into the fluid. The apparatus was lowered into the dewar flask of liquid nitrogen.

If the material froze to a white solid, a freezing point is reported. If instead the material became a transparent glassy solid, a pour point is reported.

n-$C_2F_5CF(OC_2H_5)CF(CF_3)_2$ (sample 1) had a freeze point of −70° C.

n-$C_3F_7CF(OC_2H_5)CF(CF_3)_2$ (sample 2) had a pour point of less than −100° C.

n-$C_4F_9CF(OC_2H_5)CF(CF_3)_2$ (sample 3) had a pour point of −83° C.

The resistance thermal device was not calibrated at temperatures less than −100° C.

Example 4

H-GALDEN™ ZT-130 fluid (199 grams) was distilled from a 250 mL boiling flask using a 12 inch (30 cm) downward slanting shell-in-tube condenser into another 250 mL receiver flask. The weight of the fluid captured by the receiver was continuously monitored using an Ohaus Model TP4000D digital balance (available from Ohaus Corp., Florham Park, N.J.). The head temperature of the distillation apparatus was monitored using a type-J thermocouple. Both weight and temperature measurements were recorded using a LABVIEW SCXI automated data acquisition system (available from National Instruments Corp., Austin, Tex.) at regular intervals during the course of the distillation, which took 20.9 minutes.

The same experiment was repeated except that 211.9 g of n-$C_3F_7CF(OC_2H_5)CF(CF_3)_2$ was used in place of the H-GALDEN™ ZT-130 fluid and the distillation took place over an 11.5 minute time interval.

Figure 6:
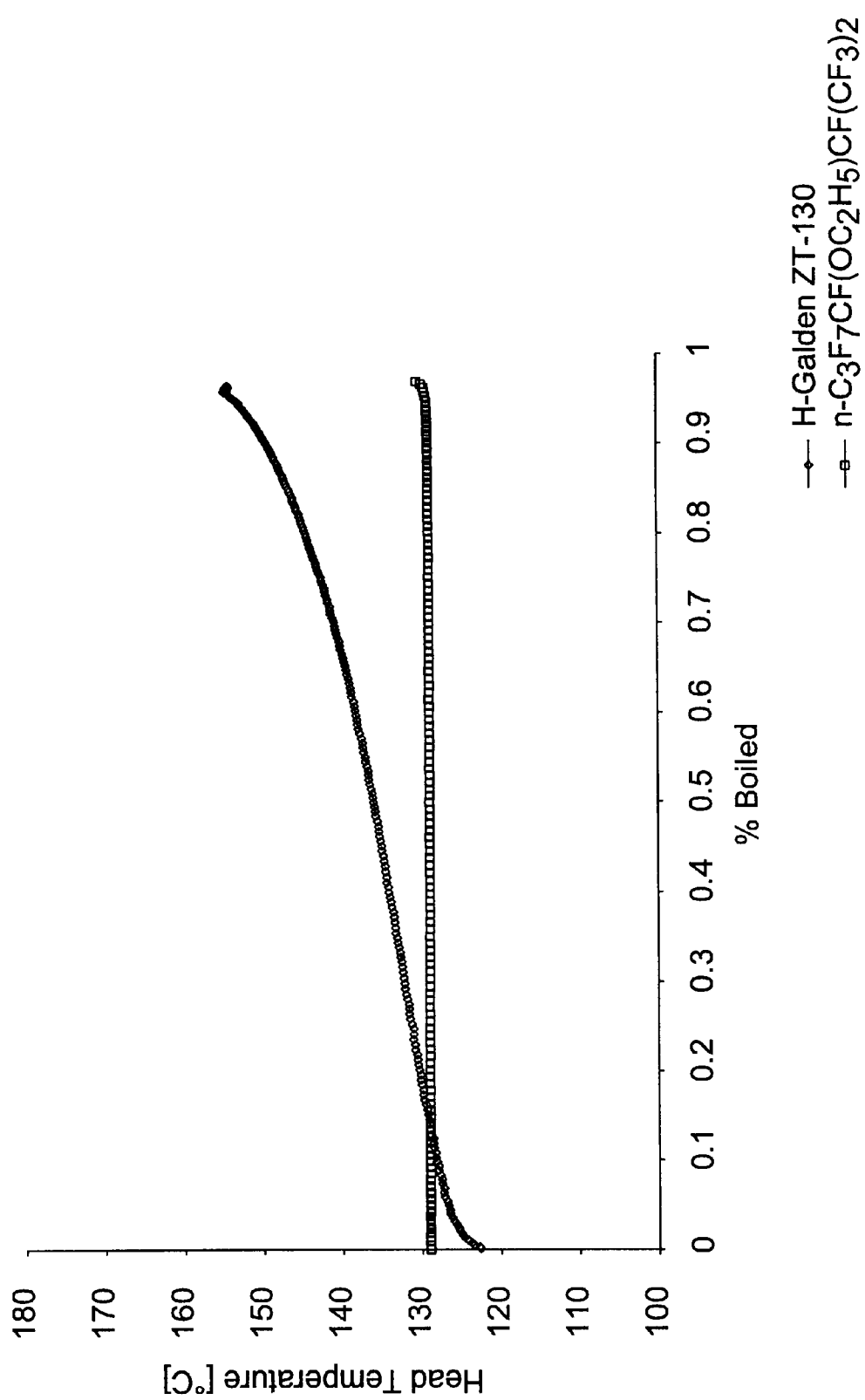
FIG. 6 is a graph of the data from Example 4 of the head temperature versus the percent boiled.

The resulting distillation curves, presented in FIG. 6 as head temperature vs. percent boiled, show that the boiling point of the n-$C_3F_7CF(OC_2H_5)CF(CF_3)_2$ remained unchanged until over 95% of the fluid had boiled over into the receiver. In contrast, the boiling point of the H-GALDEN™ ZT-130 fluid increased from an initial value of around 123° C. to as high as 155° C. when over 90% of the fluid had boiled over into the receiver, with the remaining fluid having a higher viscosity than the initial fluid. Thus, better temperature and viscosity control is possible when the n-$C_3F_7CF(OC_2H_5)CF(CF_3)_2$ is employed as a wide temperature range heat-transfer fluid.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:

1. An apparatus requiring heat transfer comprising:
   (a) a device; and
   (b) a means for transferring heat to or from said device, comprising using a heat-transfer fluid,
wherein said heat transfer fluid is a single composition of 3-ethoxy-perfluoro(2-methylhexane) having at least 95 percent purity.

2. The apparatus according to claim 1, wherein said device is selected from the group consisting of microprocessors, wafers used to manufacture semiconductor devices, power control semiconductors, electrical distribution switch gear, power transformers, circuit boards, multichip modules, packaged and unpackaged semiconductor devices, chemical reactors, nuclear reactors, fuel cells, lasers, and missile components.

3. The apparatus according to claim 1, wherein said device is heated.

4. The apparatus according to claim 1, wherein said device is cooled.

5. The apparatus according to claim 1, wherein said device is maintained at a selected temperature.

6. The apparatus according to claim 1, wherein said means for transferring heat is selected from the group consisting of temperature controlled wafer chucks in PECVD tools, temperature controlled test heads for die performance testing, temperature controlled work zones within semiconductor process equipment, thermal shock test bath liquid reservoirs, and constant temperature baths.

7. A method for transferring heat comprising the steps of:
   (a) providing a device;
   (b) providing a means for transferring heat comprising a heat-transfer fluid; and
   (c) using the heat-transfer fluid to transfer heat to or from the device,
wherein the heat-transfer fluid is a single composition of 3-ethoxy-perfluoro(2-methylhexane) having at least 95 percent purity.

* * * * *